(12) United States Patent
Boxwell et al.

(10) Patent No.: US 11,347,800 B2
(45) Date of Patent: May 31, 2022

(54) PSEUDO PARSE TREES FOR MIXED RECORDS

(71) Applicant: International Business Machines Corporation, Armonk, NY (US)

(72) Inventors: Steven A Boxwell, Columbus, OH (US); Kyle M Brake, Westerville, OH (US); Keith G Frost, Delaware, OH (US); Stanley J Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/732,908

(22) Filed: Jan. 2, 2020

(65) Prior Publication Data

US 2021/0209163 A1 Jul. 8, 2021

(51) Int. Cl.
*G06F 16/901* (2019.01)
*G06F 40/211* (2020.01)
(Continued)

(52) U.S. Cl.
CPC .......... *G06F 16/9027* (2019.01); *G06F 8/427* (2013.01); *G06F 16/3329* (2019.01); *G06F 40/211* (2020.01); *G06F 40/289* (2020.01); *G06F 40/30* (2020.01); *G06V 30/274* (2022.01); *G09B 7/02* (2013.01)

(58) Field of Classification Search
CPC .......... G06F 16/9027; G06F 16/90332; G06F 16/3329
See application file for complete search history.

(56) References Cited

U.S. PATENT DOCUMENTS 7,937,402 B2  5/2011  Feng
8,983,989 B2  3/2015  Srikanth
(Continued)

OTHER PUBLICATIONS

Kannan et al., "Matching unstructured product offers to structured product specifications," KDD '11: Proceedings of the 17th ACM SIGKDD international conference on Knowledge discovery and data mining Aug. 2011 pp. 404-412 https://doi.org/10.1145/2020408.2020474 (Year: 2011).*

(Continued)

*Primary Examiner* — Mark D Featherstone
*Assistant Examiner* — Kweku William Halm
(74) *Attorney, Agent, or Firm* — Jeffrey S. LaBaw; Feb R Cabrasawan; David Maltheis

(57) ABSTRACT

A method, apparatus and computer program product for creating parse trees from mixed records is described. A mixed record is received including a first entry containing a first natural language phrase and a second entry containing a first structured data entry. Using the first natural language phrase, a first parse tree structure is created joining words in the first natural language phrase with natural links indicating their semantic relationship within the first natural language phrase. A first synthetic node is created which represents the first structured data entry. The first synthetic is joined to the first parse tree structure using a synthetic link to a node in the parse tree to produce a pseudo parse tree. The pseudo parse tree is sent to a question answer system for answering user queries by reference to the pseudo parse tree.

21 Claims, 11 Drawing Sheets

(51) Int. Cl.
    *G06F 8/41*     (2018.01)
    *G06K 9/72*     (2006.01)
    *G06F 40/289*     (2020.01)
    *G06F 40/30*     (2020.01)
    *G06F 16/332*     (2019.01)
    *G09B 7/02*     (2006.01)
    *G06V 30/262*     (2022.01)

(56) References Cited

U.S. PATENT DOCUMENTS

| | | | |
|---|---|---|---|
| 9,842,166 B1 * | 12/2017 | Leviathan | G06F 16/9024 |
| 10,282,444 B2 | 5/2019 | Bozkaya | |
| 2005/0262056 A1 | 11/2005 | Hamzy | |
| 2015/0356463 A1 | 12/2015 | Overell | |
| 2016/0179934 A1 * | 6/2016 | Stubley | G06N 5/00 |
| | | | 707/722 |
| 2018/0365082 A1 * | 12/2018 | Richardson | G06F 8/51 |
| 2019/0095420 A1 * | 3/2019 | Galitsky | G06F 16/9014 |
| 2019/0114360 A1 * | 4/2019 | Garg | G06F 40/14 |

OTHER PUBLICATIONS

Baik, C., Jagadish, H. V., & Li, Y. (2019). Bridging the Semantic Gap with SQL Query Logs in Natural Language Interfaces to Databases. arXiv preprint arXiv:1902.00031.

Bai, Z., Yu, B., Wu, B., Wang, Z., & Wang, B. (2018). Learning to Generate Structured Queries from Natural Language with Indirect Supervision. arXiv preprint arXiv:1809.03195.

* cited by examiner

PSEUDO PARSE TREES FOR MIXED RECORDS

BACKGROUND OF THE INVENTION

This disclosure relates generally to question answering in user interfaces. More particularly, it relates to constructing a pseudo parse tree of automatically generated records for question answer systems.

In many computer applications, automatic and semi-automatic records are generated regularly to maintain an auditable trail of events. For example, security logs are created and maintained describing network activity. A ship log is created and maintained describing events onboard a naval vessel. Searching the logs for answers in response to a user query typically requires specific database queries (with knowledge of the log format) or careful manual searching. The fields used in such log records can vary from application to application or even from record to record. Further, because these logs frequently contain both structured data, e.g., values for variables kept in specific columns in the log, and unstructured data, e.g., sentences or phrases in a natural language, it is difficult to construct a database which forms the needed connections between the structured data and unstructured data needed for providing information used to answer user queries. Specifically, information in such logs can be used as input to question answer (QA) systems.

Further improvements in ingesting logs for QA systems are needed.

BRIEF SUMMARY

According to this disclosure, a method, apparatus and computer program product for creating parse trees from mixed records. A mixed record is received including a first entry containing a first natural language phrase and a second entry containing a first structured data entry. Using the first natural language phrase, a first parse tree structure is created joining words in the first natural language phrase with natural links indicating their semantic relationship within the first natural language phrase. A first synthetic node is created which represents the first structured data entry. The first synthetic is joined to the first parse tree structure using a synthetic link to a node in the parse tree to produce a pseudo parse tree. The pseudo parse tree is sent to a question answer system for answering user queries by reference to the pseudo parse tree.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, the invention provides a method, system and computer program product in which Pseudo-Parse Tree (PPT) is constructed from a "mixed record". For the purposes of the invention, a "mixed record" is a record which contains both structured and unstructured data. Parse trees are created from the unstructured data. From the structured (typically, single-token) record parts of the mixed record are linked to the "root" or "head" of the parse tree using artificial syntactic dependencies. This allows the entire record, both structured and unstructured data to be represented as a single parse tree. In preferred embodiments, the pseudo-parse tree is then mapped to natural language (NL) questions from a user query, similar to the way that syntactic alternations (like active voice/passive voice) are mapped to (NL) questions.

In the prior art, "table narration" could be used to provide information to question answer (QA) systems to answer user queries. However, it requires very specific knowledge of the formatting of the record (e.g., tabular data) that contains both unstructured and structured data. For example, with a two-column table of national capitals, e.g., containing the capitals in a first column and the countries in a second column, a tool which knows the meaning of each column can "dictate" a natural language sentence like "The capital of ALBANIA is TIRANA"; "The capital of ANDORRA is ANDORRA LA VELLA", and so forth. The natural language sentences may be then provided to a question answer system to answer user queries. Table narration is one means of converting the structured data to an unstructured form. However, this approach is limited in that it requires specific knowledge of the table and cannot be generalized without manual intervention (i.e. informing the dictation application of the table syntax). The present invention addresses the shortcomings of the prior art.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 1:
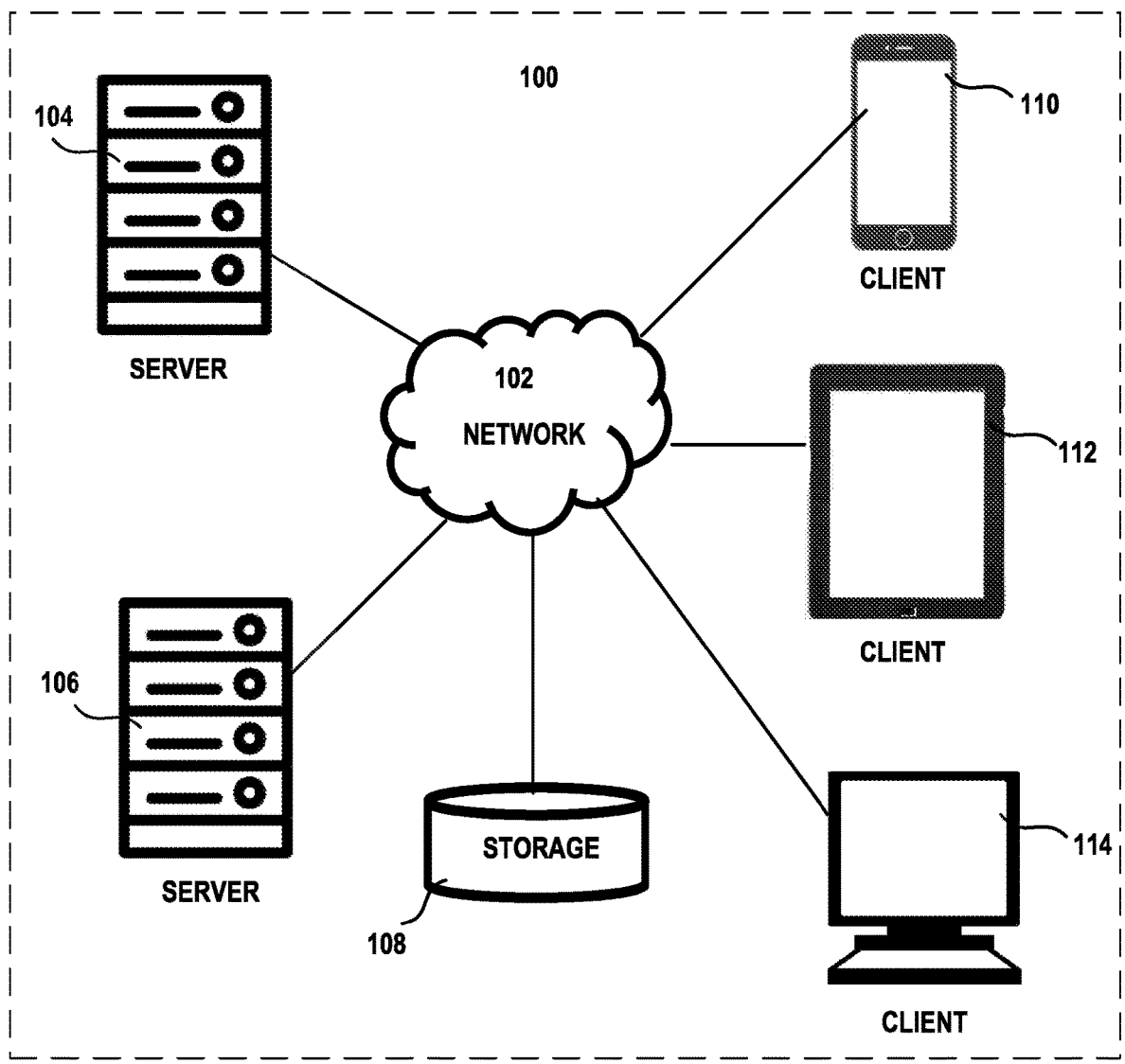
FIG. 1 depicts an exemplary block diagram of a distributed data processing environment in which exemplary aspects of the illustrative embodiments may be implemented.
Figure 2:
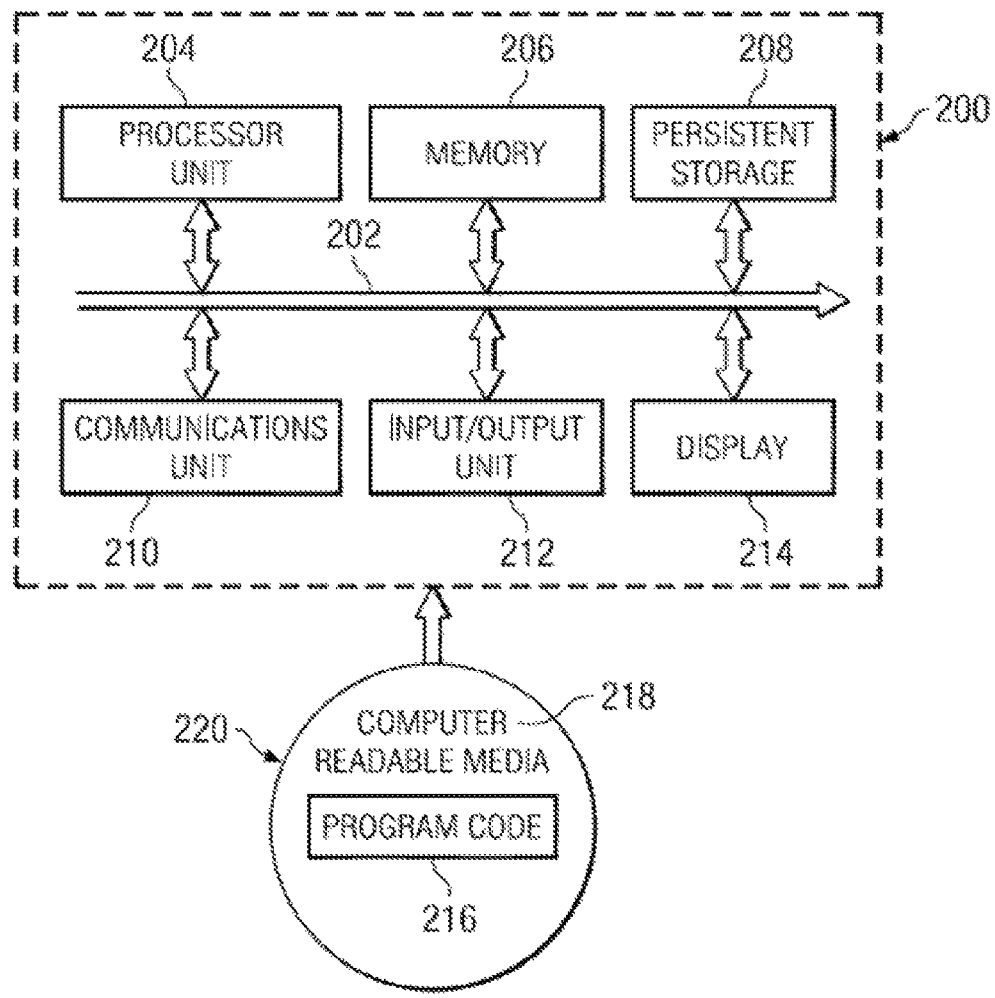
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212 and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

In computational linguistics, a parse tree or parsing tree is an ordered tree that represents the syntactic or semantic structure of a string, according to a context-free grammar. Parse trees are used to represent unstructured data, such as sentences or phrases in a natural language (e.g., English). In the invention, parts of the record which are structured data are combined in a "pseudo parse tree" with parse trees constructed with a parser from the associated natural language text. As compared to the prior art, the advantages of the invention include the fact that the system does not need to know anything about the record format. Thus, the system can handle multiple types of logs or other mixed records without any prior knowledge of the specific log syntax.

In the description of the invention, a "synthetic" or "artificial" node, link or syntactic dependency is one created by the invention to link portions of the mixed record which would not normally be linked by a natural language parser creating a parse tree. A "normal" syntactic dependency is a link between two tokens in a natural language sentence or phrase by such a parser. For example, in the sentence "The dog ate the steak", there is a syntactic dependency between the words "ate" and "steak", indicating that "steak" is the direct object of the verb "ate". This relationship will be recognized by the NL parser. One of the innovations of the inventive approach is to treat cells containing structured data in a mixed record as if they were linked in the same way, that is, to construct an "artificial" or "synthetic" syntactic dependency. For example, in preferred embodiments, a synthetic syntactic dependency is created between the root of a parse tree created from a portion of unstructured text and the field containing a structured data record. The inventors refer to the resulting tree as a "pseudo parse tree". A prior art parse tree would provide a grammatical analysis of a single English sentence. The "pseudo" parse trees of the invention combine the grammatical analysis of one or more sentences or phrases (depending on the mixed record) with artificial syntactic dependencies, which are created between cells in the mixed record containing structured data, or in some embodiments between respective parse trees created from different phrases in the mixed record.

Figure 3:
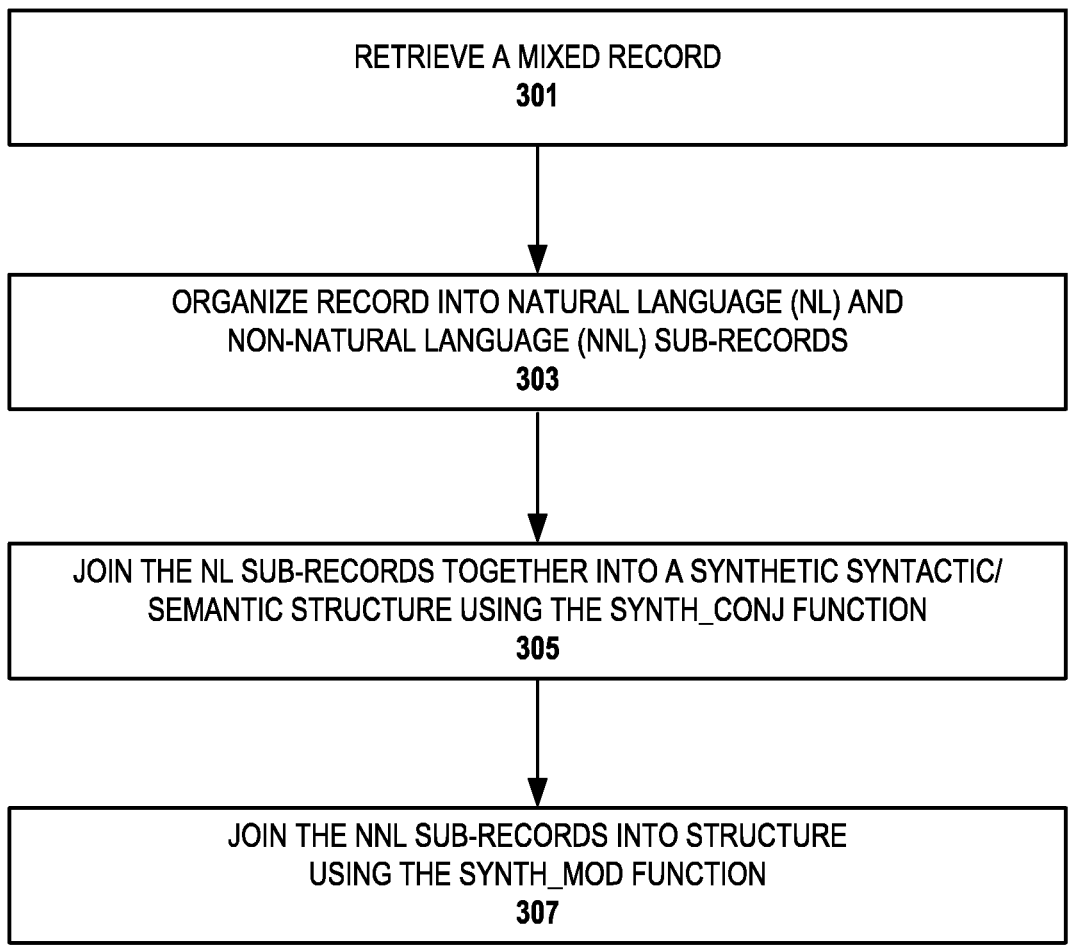
FIG. 3 is a flow diagram for retrieving a mixed record and processing the mixed record according to an embodiment of the invention.

FIG. 3 is a flow diagram for retrieving a mixed record and processing the mixed record according to an embodiment of the invention. In step 301, the system retrieves a mixed record such as a log; a mixed record contains both structured and unstructured data. A log is one example of a mixed record in which entries for a set of events which are created, formatted and entered by row by row into the mixed record. While the description which follows is directed to examples using logs, other records which assemble mixed data (structured and unstructured data) in columns and/or rows can be used in embodiments of the invention.

In some embodiments, structured data is input into fields of the log which stores values of particular variables entered automatically by a computer entity, e.g., a computer program. Non-limiting examples of structured fields include a timestamp or other date/time related data, or location based data, e.g., an actual (geographic) or virtual (e.g., an IP address) location. In these embodiments, unstructured data is input by a user in other fields of the mixed record.

A representative entry in the log would contain both the structured data created by the computer entity, for example, a time and place, and the unstructured data created by a human user, for example, a description of an event which occurred at the time and place. In other embodiments, the unstructured data is created by an automatic natural language process (NLP) which is programmed to create human readable sentences or phrases which describe events, e.g., an alert describing an intrusion. In yet other embodiments, the log may contain both structured and unstructured data input by a user. In other embodiments, the log may include unstructured and structured data from both the system and user. For example, system entered data could include intrusion event data from a security program containing both structured and unstructured data and the human entered data could include a description of the actions taken to ameliorate the intrusion (unstructured) and well as an indication whether the actions were successful (Y or N; structured field). Those skilled in the art will understand that in embodiments of the invention, the log is produced by a separate software program than the program that analyzes the log for future queries.

In step 303, in some embodiments, the mixed record is organized into separate unstructured (Natural Language (NL)) and structured (non-Natural Language (NNL)) sub-records. The sub-records are organized so that the system knows from which row or column the structured or unstructured data originated in the original mixed record. In other embodiments, the respective fields of the mixed record are parsed and marked as structured or unstructured data. While in some embodiments of the invention, the system can receive data or header information indicating which fields contain structured or unstructured data, in preferred embodiments, the system is able to determine which fields contain which type (structured, unstructured) of information. While the description assumes that the embodiment has no prior knowledge of the format of the mixed record, the embodiment does have syntactic or semantic based tools, e.g., as part of the parser, which are able to determine whether the data is likely structured data or unstructured data as well as whether similar kinds of data are entered row by row or column by column. As is known to those skilled in the art, syntactic means following the rules of a given language, e.g., a natural language, which govern the structure of a string, e.g., a sentence or phrase in a natural language. Semantic is concerned with the relationship between words and their meanings. Thus, there can be overlap between the syntactic and semantic rule sets used for parsing unstructured data.

In embodiments of the invention, where parsing of the first few records show that structured data is consistently stored in a first set of columns (or rows) while unstructured is consistently stored in a second set of columns (or rows), that information can be stored for the log, predicting that the other fields will be consistent with the first few columns or rows. In embodiments where logs are created by other computer entities or computer/user teams, this information can be used to predict where structured and unstructured data will be stored in future logs received from that computer entity or computer/user team.

In step 305, the unstructured, natural language sub-records are parsed and then joined or linked together into a parse tree structure. In embodiments of the invention, the parse tree is created by a set of syntactic and/or semantic rules. Where needed, a "synthetic" node is created to link parse trees created from respective unstructured pieces of data. A SYNTH_CONJ function is used to create the pseudo-parse tree structures in some embodiments which is explained in greater detail below.

In step 307, the structured (NNL) sub-records are joined or linked to respective parse tree structures. In embodiments of the invention, the system links nodes representing the structured data to the parse tree structures, thus creating a "pseudo-parse tree". In embodiments of the invention, the links between nodes representing the structured data and the nodes representing the unstructured data (connecting the natural language elements) within the parse tree are designated differently. For example, the links connecting natural language elements can be the normal links and format created by a natural language parser, e.g., subject, object links. The links between structured and unstructured links are designated by a new type of link, e.g., a structuredUnstructuredLink. The link designations are useful when there is some type of distinction in the user query between structured and unstructured data, or a presumption of confidence regarding the reliability of the structured as compared to the unstructured data in the QA system. In embodiments of the invention, the SYNTH MOD function (explained in greater detail below) is used to link the structured data to the parse tree structures.

Figure 4:
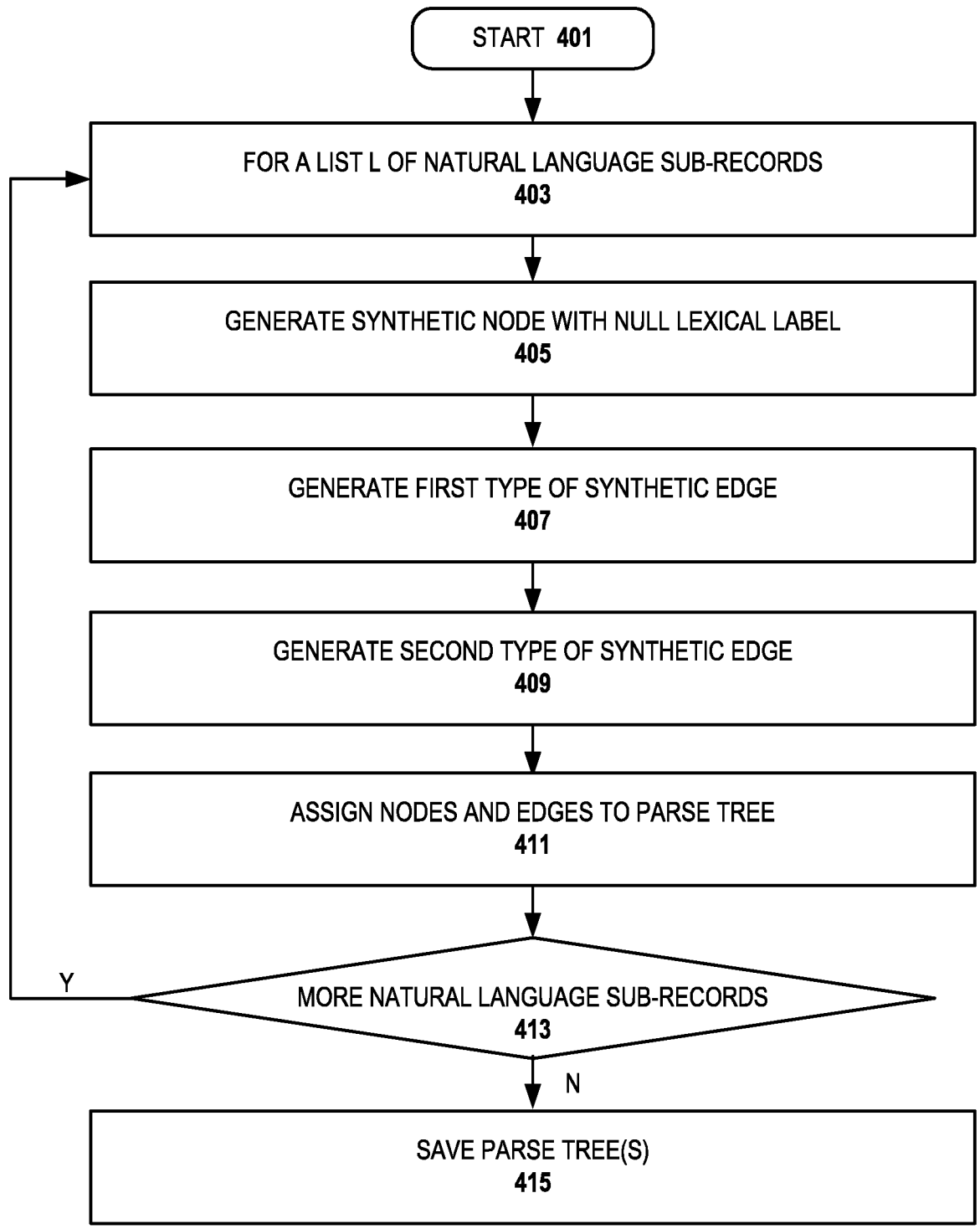
FIG. 4 is a flow diagram for processing the natural language or unstructured portions of a mixed record according to an embodiment of the invention.

FIG. 4 is a flow diagram for processing the natural language (NL) or unstructured portions of a mixed record according to an embodiment of the invention. In preferred embodiments, a parse tree is constructed from the NL portions. A parse tree is also known as a parsing tree or syntax tree and is an ordered, rooted tree that represents the syntactic or semantic structure of a string according to some formal grammar such as a phrase structure grammar or a dependency grammar. Parse trees may be generated for sentences in natural languages according to a variety of known grammars and technologies.

In step 401, the process starts by initializing a natural language (NL) parser. As is known, an NL parser analyzes a string of symbols in a natural language conforming to the rules of a formal grammar. Most modern parsers are at least partly statistically based; some rely on a corpus of training data which has already been annotated by hand. This enables the system to gather frequency information about the words and how they occur in specific contexts. In step 403, a first NL entry of a list L of Natural Language sub-records, e.g., from the original mixed record, is received by the parser. The parser breaks down the NL text into its component parts, e.g., parts of speech, and builds the parse tree. In this process, normal nodes and normal edges comprise the parse tree. In step 405, in some embodiments, the parser generates a synthetic node with a null lexical label to serve as a root node for the NL text. Next in step 407, the parser generates a first type of synthetic edge for connecting the root node to other nodes, e.g., synthetic nodes for the structured data. In step 409, if needed, the parser generates a second type of synthetic edge to other nodes. In some embodiments, a single type of normal edge is generated between NL nodes, while synthetic edges connect the parse tree to synthetic nodes representing the structured data. In other embodiments, a plurality of types of normal edges are generated. In step 411, the parser assigns the generated nodes and edges to a parse tree. In step 413, if there are more NL entries in the list L, the parser process returns to step 403. In step 415, if there are no more NL entries, the parse tree(s) are stored in the computer memory. Note that depending upon the format of the log (or other mixed record), more than one NL sub-record from a given entry in the mixed record may be converted into a parse tree. Pseudocode for the illustrated SYNTH_CONJ function is presented below.

The system links the elements of the natural language sub-records. Embodiments of the invention link the two parse trees by generating a synthetic node (or token) that is linked to a matrix word of the two parse trees. Where there is a plurality of natural language phrases converted into parse trees for a particular row or column, the synthetic token is connected to each parse tree for a respective natural-language sub-record. After that is done, then the synthetic token which links the parse trees is linked by synthetic edges to the synthetic nodes representing the non-natural-language sub-records. These synthetic edges are called "synthetic" because they are unlike the dependencies between words in a sentence which are "naturally" occurring; the invention "artificially" links the structured and unstructured cells together to reflect their presence in the same row or column of the mixed record. Once the synthetic tokens and synthetic links are created, the pseudo-parse tree is produced.

While many alternative means of storing data are known to the art, some embodiments of the invention use a knowledge graph. A knowledge is created using the pseudo-parse trees as input to one of the methods known to the prior art for constructing knowledge graphs. Using a knowledge graph, a user query is compared to the nodes and edges of the knowledge graph so that the QA system can create an answer to the user query. In alternative embodiments, standard object storage stores the entire pseudo-parse trees as individual units, then the system uses standard context dependent answer scorers (e.g., LFACS, SkipNGram, Edit Distance) to compare the stored pseudo-parse tree records to parse trees created from the natural language user questions.

Figure 5:
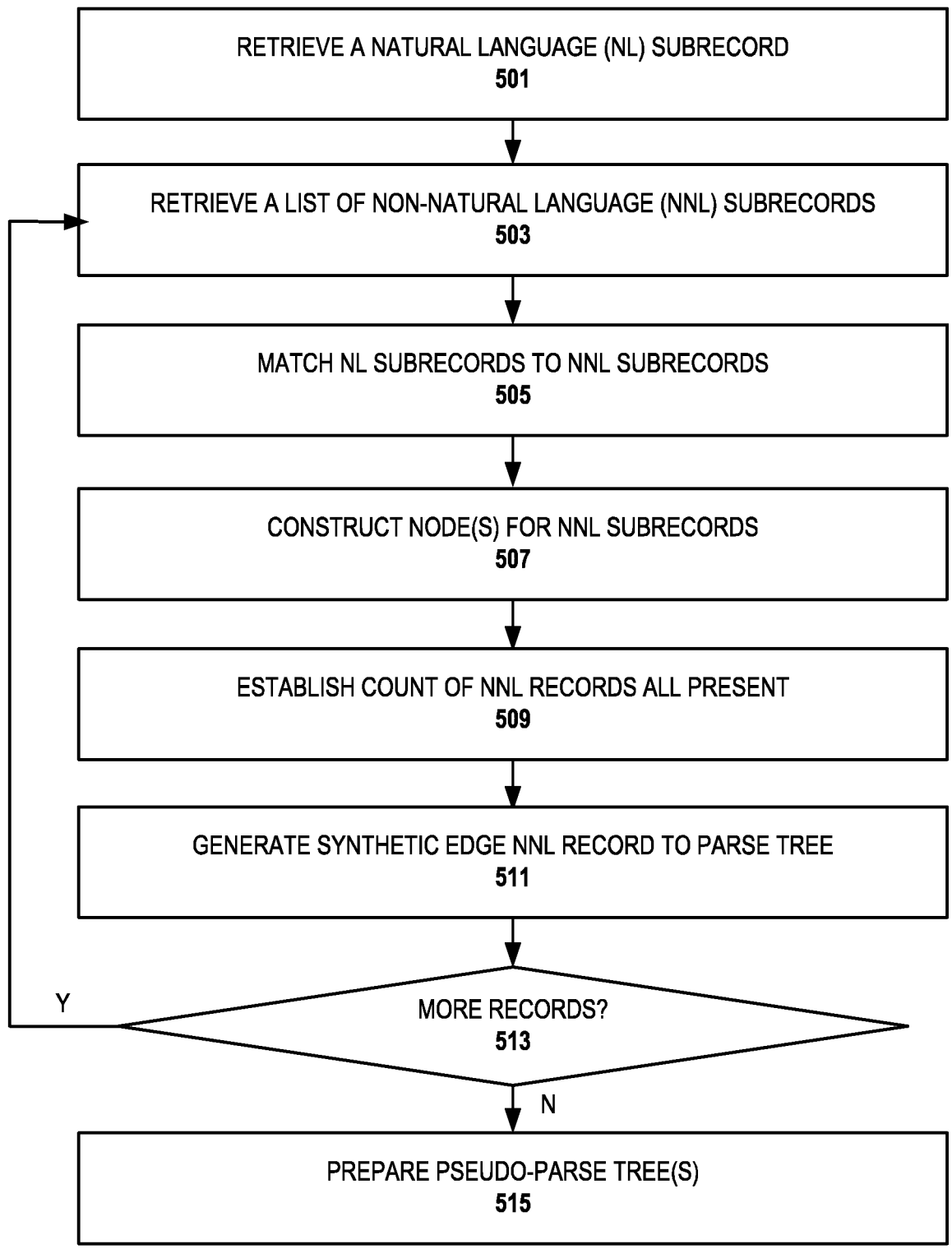
FIG. 5 is a flow diagram for linking structured portions of the mixed records to the processed unstructured portions of the mixed record according to an embodiment of the invention.

FIG. 5 is a flow diagram for linking structured portions of the mixed records to the processed unstructured portions of the mixed record (the parse trees) according to an embodiment of the invention. In step 501, a first (next) Natural Language (NL) sub-record is retrieved from storage. In step 503, a list of Non-Natural Language (NNL) sub-record(s) which correspond to the first (next) NL sub-record is retrieved from memory. In step 505, synthetic nodes are created for the NNL sub-record(s) which correspond to the first (next) parse tree. In step 507, a count of the NNL records corresponding to the first (next) parse tree is established. In step 509, while there are NNL sub-records which correspond to the parse tree, in step 511 a synthetic edge is generated connecting the respective NNL sub-record to the "head" or the "root" of the parse tree. In some embodiments, a synthetic node serves as the root of multiple parse trees. Note that depending upon the format of the log (or other mixed record), more than one NNL sub-record may be associated with a respective parse tree constructed from the first (next) NL phrase in the NL sub-record. In step 513, it is determined whether there are any more NNL sub-records or NL sub-records to be processed. If so, the process returns to step 501. If not, in step 515, the pseudo parse trees prepared for question answering are returned. In some embodiments, the pseudo parse trees are sent to a question answer (QA) system.

After the pseudo parse trees are created, they are stored in one or more computer storage media. In a first embodiment, the pseudo parse trees are stored as individual pseudo parse trees in a collection of pseudo parse trees. In another embodiment, the pseudo parse trees are stored as part of a knowledge graph. The knowledge graph is built from the pseudo parse trees using a known technique such as entity and relation extraction, selecting particular entities and relationships or creating the knowledge graph using multiple techniques.

To explain the invention in an exemplary embodiment, suppose there is a semi-structured, mixed record as follows, documenting events onboard a vessel, the Constellation. In Table 1, a few entries of the log are listed:

TABLE 1

| Planet | Star Date | User log entry | System entry - fuel |
|---|---|---|---|
| Rigel 4 | 18256.1 | The ship plunged first into a temporal wave, turning everyone into babies. | Expended 10 Units of Fuel |
| Rigel 4 | 18256.2 | Everyone turns back into adults. | Expended 0 Units of Fuel |
| Devore 2 | 18258.6 | Buster gets his head stuck in a bucket | Expended 20 Units of Fuel |
| Bajor | 18260.9 | Centurions force Roger to fight a gorilla. | Expended 15 Units of Fuel |
| Asimov 12 | 18275.1 | A replication error populated the ship with muffins | Expended 11 Units of Fuel |
| Rigel 4 | 18290. 8 | The Constellation is attacked by Kaarg | Expended 10 Units of Fuel |
| . . . | . . . | . . . | . . . |

In this embodiment, suppose that both structured and unstructured data are semi-automatically generated data by "The Computer" (i.e. generated by the system rather than a human user) in the Planet, Star Date and System entry-fuel columns, while other information is entered by the user in a natural language in the column "User log entry". The record contains critical pieces of information which can be useful to a QA system; however, the structured data is separated from the natural language data and appears in different parts of the mixed record.

Suppose that a more primitive, or perhaps merely, non-spacefaring civilization, is equipped with the technology of the present invention and a QA system and intercepts the above log (as well as other logs). Suppose that the citizens, though planet-bound, nonetheless are very interested in the activities of their spacefaring neighbors and input questions to the planetary QA system concerning these activities. Without the invention, the planetary QA system might reasonably expect to extract sentences from record parts and answer questions like "Who did the centurions force to fight a gorilla?". However, the planetary QA system would have difficulty answering things like "On what planet did the centurions force Roger to fight a gorilla?".

To address this problem, the administrators of the planetary QA system use the present invention to construct a set of pseudo parse trees (PPTs). In each PPT, the single-token, structured record parts are linked to the syntactic/semantic head/root of the parse tree (created from the NL entries) using "artificial" syntactic dependencies. This allows the entire entry of a record to be represented as a single pseudo-parse tree, which can then be mapped to natural language questions or statements in the same way syntactic alternations (like active voice/passive voice) are mapped.

Figure 6:
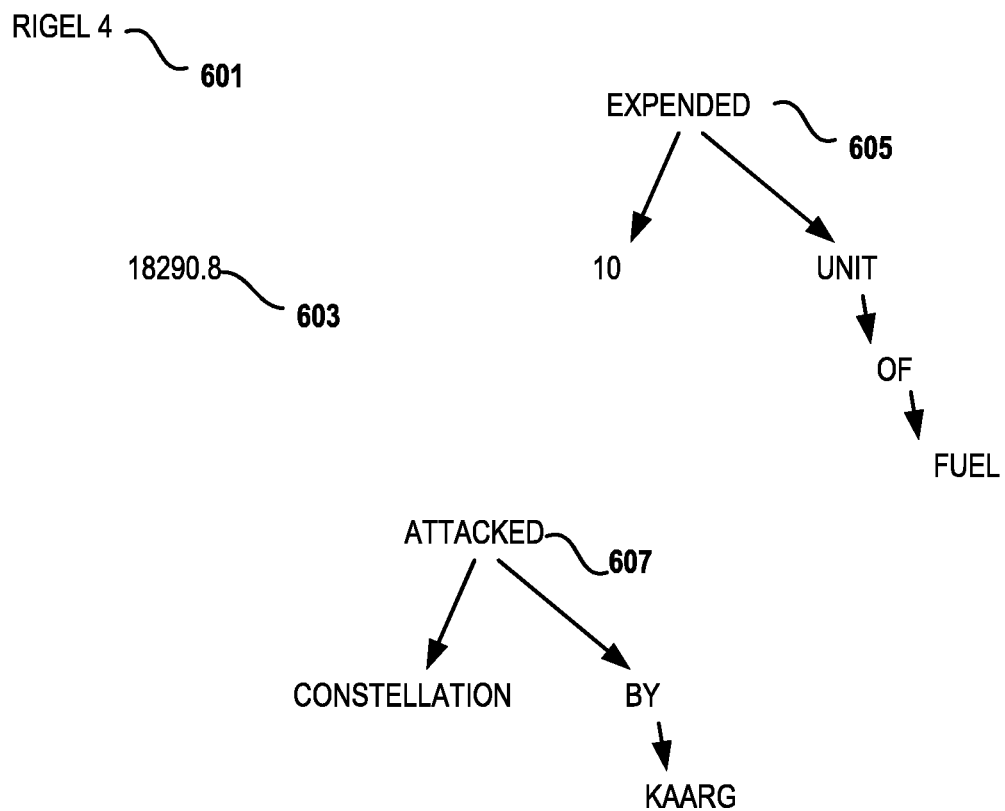
FIG. 6 is a representation of two NNL entries and two parse trees created from a mixed record after a process step according to an embodiment of the invention.

FIG. 6 is a representation of two NNL synthetic nodes 601, 603 and two parse trees 605, 607 created from the last entry in Table 1. Parse tree 605 is created from the natural language phrase "Expended 10 Units of Fuel" and parse tree 607 is created from the NL phrase "The Constellation is attacked by Kaargs". NNL entry 601 is structured data from the location field; NNL entry 603 is structured data from the star date/time field. The drawing represents the outputs of the parsing processes prior to associating the NNL and NL data with each other.

Figure 7:
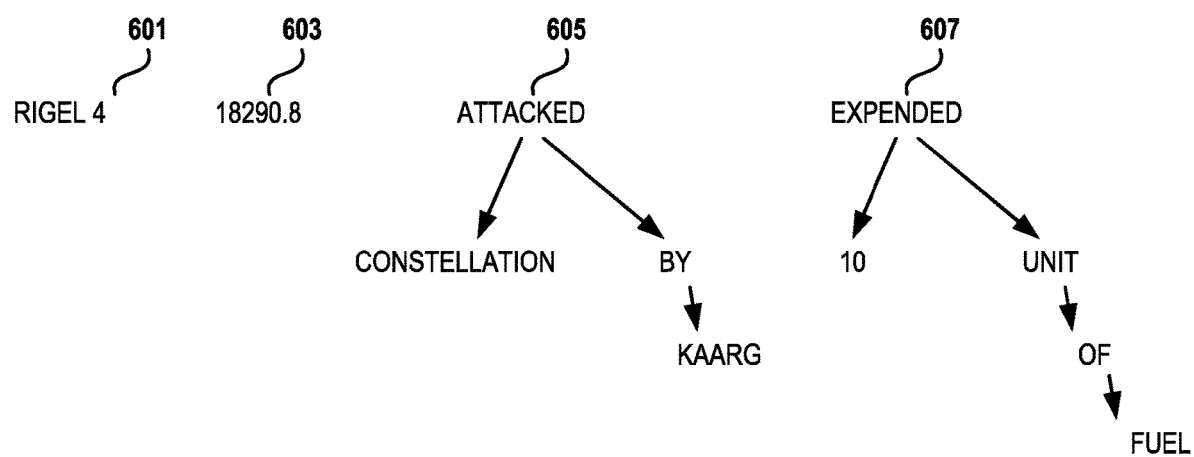
FIG. 7 is a representation of two NNL entries and two parse trees created from a mixed record after a later process step according to an embodiment of the invention.

FIG. 7 is a representation of two NNL synthetic nodes 601, 603 and two parse trees 605, 607 created from the last entry in Table 1. The drawing represents associating the outputs of the parsing processes, the NNL data 601, 603 and the parse trees of NL data 605, 607, with each other. As mentioned above, the syntactic and semantic tools included in the parser are able to tell how data is entered in the mixed record, e.g., row by row. A rule is provided that the data from a given row should be associated together.

Figure 8:
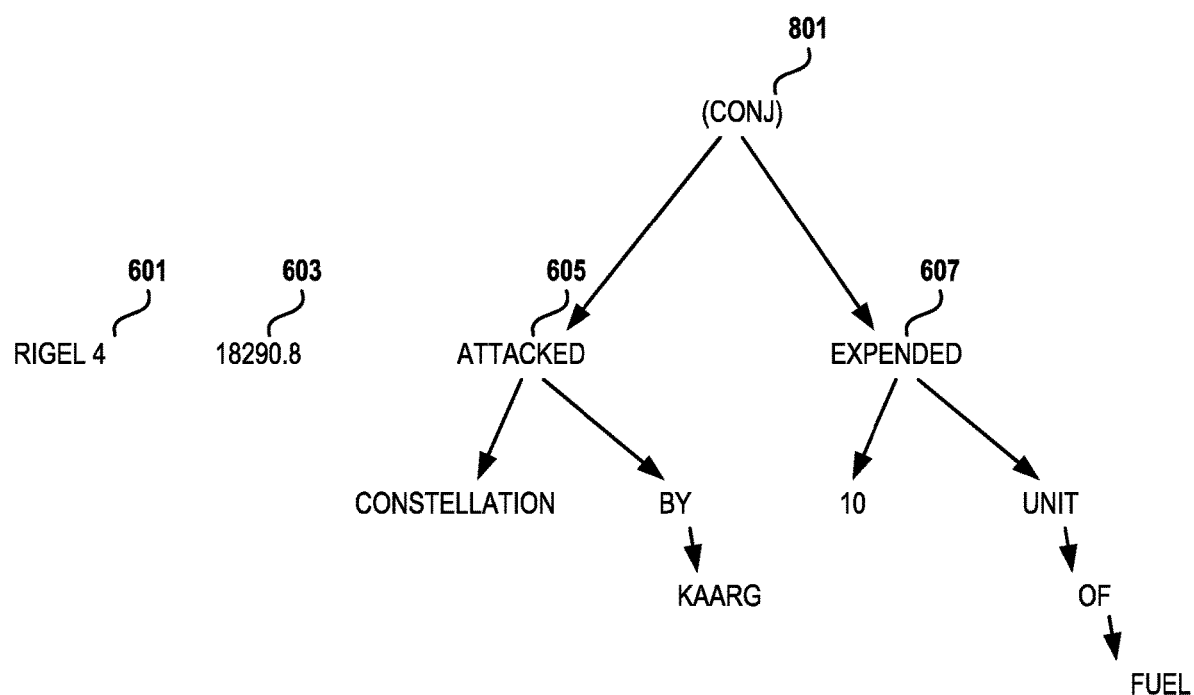
FIG. 8 is a representation of two NNL entries and two parse trees created from a mixed record after another process step according to an embodiment of the invention.

FIG. 8 is a representation of two NNL entries 601, 603 and two parse trees 605, 607 created from the last entry in Table 1. The drawing represents associating the two NL data parsing trees with each other using a synthetic node as a new root or head node for the combined tree. In this figure, a conjunction node 801 is the new root node and is linked to the two parse trees 605, 607 and heads the combined tree. In one preferred embodiment, when the connecting node 801 links two parse trees created from different NL entries of the mixed record, a "conjunction" artificial node is used, much as if the parser was combining two phrases in the natural language. As another example, if the log had two sentences in the user log entry column, e.g., a first NL sub-record "Roger fought a gorilla" and a second NL sub-record "Will fought a Lion", then the result of the process would be equivalent to "Roger fought a gorilla and Will fought a Lion".

Figure 9:
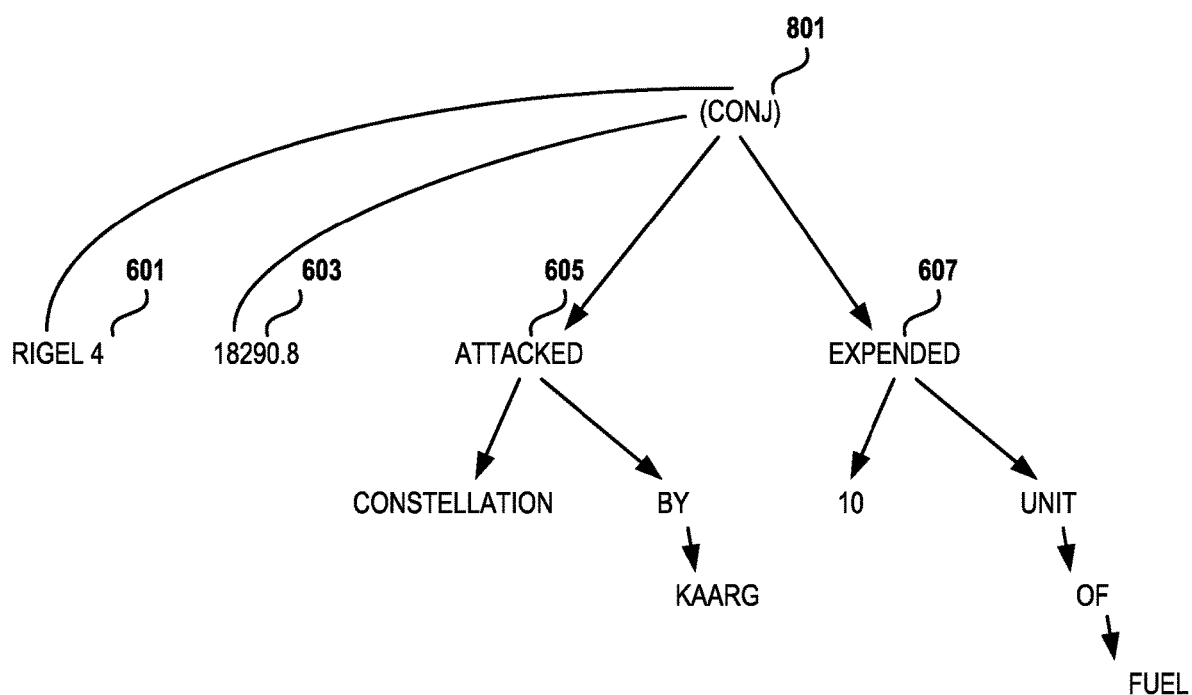
FIG. 9 is a representation of two NNL entries and two parse trees created from a mixed record merged into a pseudo-parse tree according to an embodiment of the invention.

FIG. 9 is a representation of two NNL entries and two parse trees created from a mixed record merged into a pseudo-parse tree according to an embodiment of the invention. The drawing shows NNL synthetic nodes 601, 603 and parse trees 605, 607 where synthetic links are created connecting the synthetic nodes representing the structured data 601, 603 and the synthetic conjunction node of the combined tree 801. In a preferred embodiment, a rule is used to connect the "root" node (usually a verb) of the parse trees to other elements, however, other embodiments use different rules to connect respective nodes of the parse trees to the structured elements.

Figure 10:
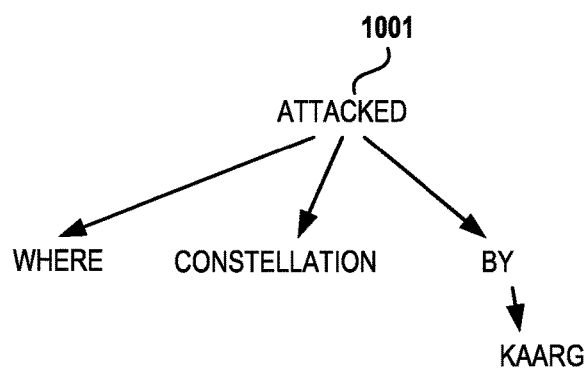
FIG. 10 is a representation of a parse tree from a user query matched against a pseudo-parse tree in a QA system according to an embodiment of the invention.
Figure 10:
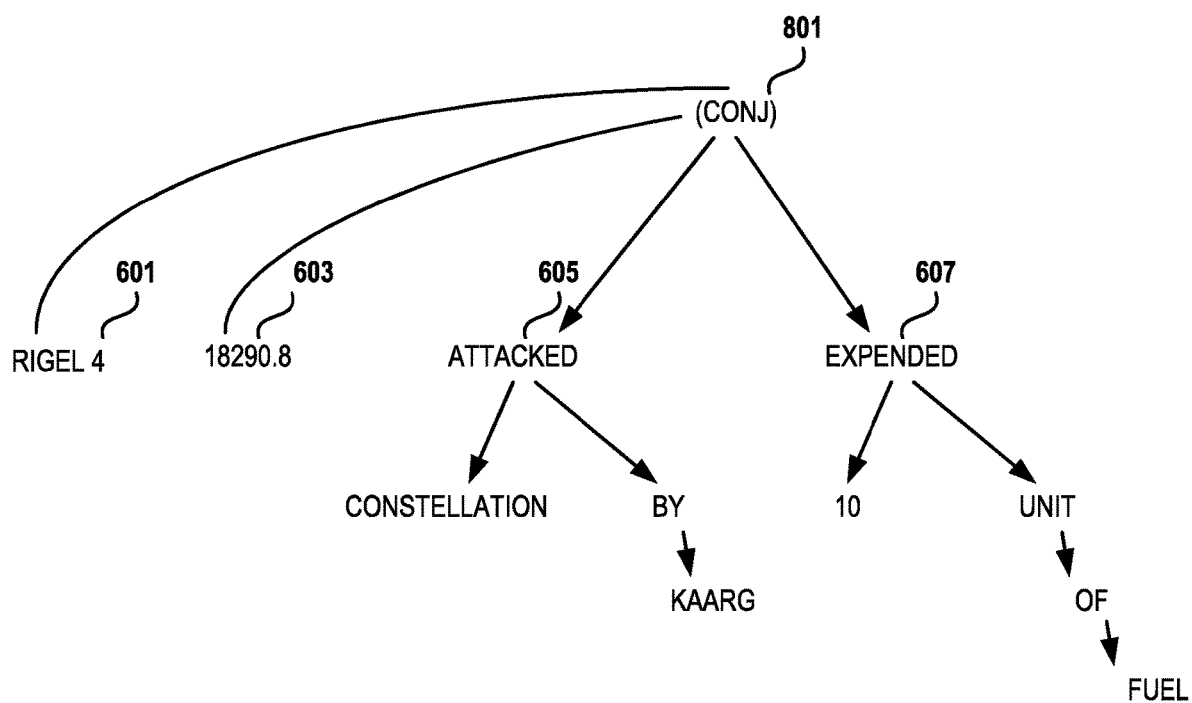

FIG. 10 is a representation of a parse tree from a user query matched against a pseudo-parse tree in a QA system according to an embodiment of the invention. In preferred embodiments, a parser using the same rules of formal grammar creates a parse tree 1001 from the user query (not shown). The user query is entered as a natural language string, e.g., "Where was the Constellation attacked by Kaargs?" in the user interface to the QA system. Once parsed into a parse tree 1001, a matching process is performed by the QA system comparing it to the pseudo-parse trees which have been created from the log records. Many matching processes are known to the art which can be used in embodiments of the invention. For example, the match can be performed according the entity similarity between the nodes in the parse tree and the different pseudo-parse trees stored by the QA system, i.e. the percentage similarity of the entity tokens. Another matching process uses a percentage amount using a count of the number of matching node (entities) and edges (relations). As can be readily seen in the drawing the parse tree closely matches the nodes in one of the subgraphs 605 which comprises the pseudo-parse tree 801. Thus, the QA system can infer by using a standard context dependent answer scorer that Rigel 4 601 is one possible answer to the user query.

Figure 11:
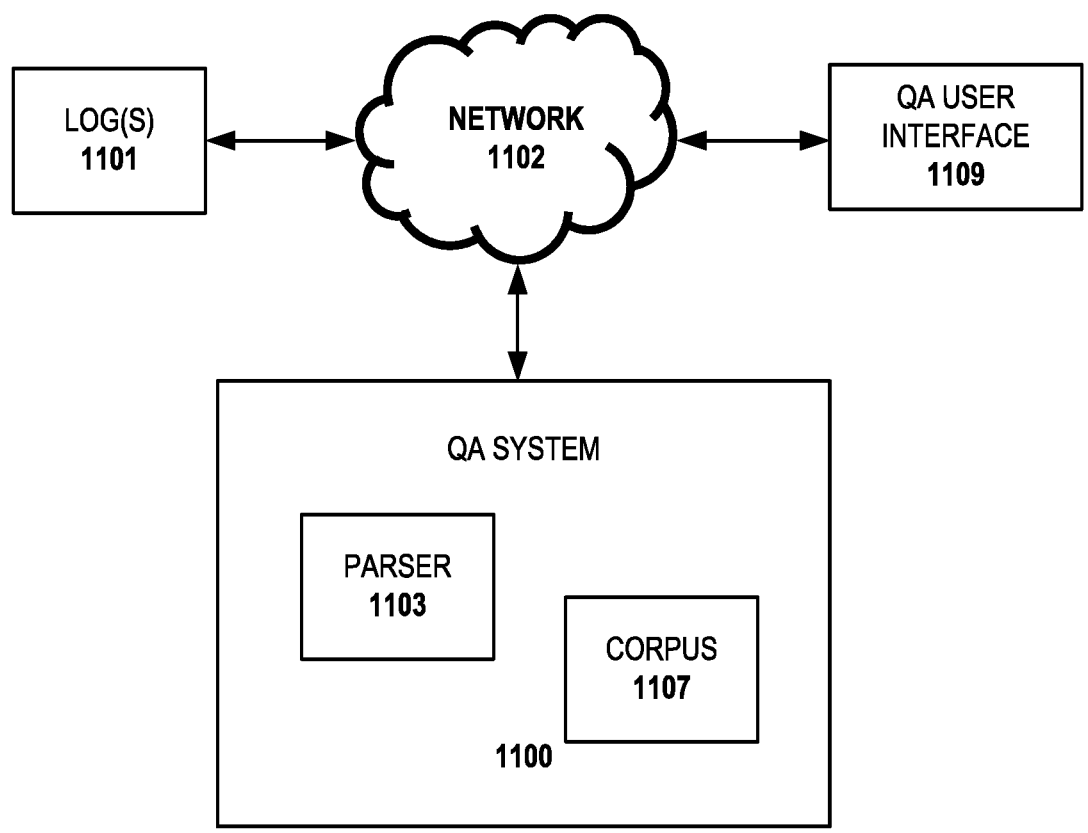
FIG. 11 is an architectural diagram of a system in which embodiments of the invention can be implemented.

FIG. 11 depicts a schematic diagram of one illustrative embodiment of a question/answer creation (QA) system 1100 which receives logs 1101 via a computer network 1102. In this drawing, the QA system 1100 includes the parser 1103 which creates the pseudo parse trees and the corpus 1107 which includes the plurality of pseudo parse trees or their derivatives, e.g., a knowledge graph. In this location, the parser 1103 can also be used to create a logical form from the user queries created by a user on the QA User interface 1109. However, in other embodiments, the parser software may be resident on one or more systems in the network. Likewise, the QA system 1100, the software that creates the logs 1101 and the software that supports the QA user interface 1109 may be resident on one or more devices in the network. The devices can be similar to those as described above in connection with FIGS. 1 and 2 and comprising one or more processors. Different modules of the programs may be resident in one or more memories and distributed among the devices. The devices comprising the system are any computing device elements generally known in the art including buses, storage devices, communication interfaces, and the like. The network 102 may include multiple computing devices 104 in communication with each other and with other devices or components via one or more wired and/or wireless data communication links, where each communication link may comprise one or more of wires, routers, switches, transmitters, receivers, or the like. QA system 1100 uses parser 1103 to convert log entries from the logs 1101 into pseudo-parse trees which are stored in the corpus 1107 used by question/answer (QA) system to provide answers for one or more users via a user interface. Other embodiments of QA system 1100 may be used with components, systems, sub-systems, and/or devices other than those that are depicted herein.

In some illustrative embodiments, QA system 1100 may be the IBM Watson™ QA system available from International Business Machines Corporation of Armonk, N.Y., which is augmented with the mechanisms of the illustrative embodiments described herein. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. In embodiments of the invention, the corpus would be at least in part comprised of the pseudo-parse trees or their derivatives, e.g., a knowledge graph.

The IBM Watson™ QA system performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Sample pseudocode is presented below that can be used to implement embodiments of the invention.
Pseudocode:

```
For a mixed Record R
Organize R into Natural Language (NL) and Non-Natural
Language (NNL) sub-records.
Join the NL sub-records together into a synthetic
syntactic/semantic structure S using the SYNTH_CONJ function.
Join the NNL sub-records into S using the SYNTH_MOD function.
The SYNTH_CONJ function:
For a list L of Natural Language sub-records
Let i = 1
Let X be L[0]
While i < (len(L) − 1)
-- Generate synthetic node N with null lexical label
-- Generate synthetic edge lconj to X
```

-continued

```
-- Generate synthetic edge rconj to L[i]
-- Assign X to N
Return X
The SYNTH_MOD function:
Let X be a Natural Language (NL) subrecord
Let Z be a list of Non-Natural Language (NNL) subrecords
Set Y to be the syntactic/semantic head of X
let i = 0
While (i < len(Z))
-- Generate synthetic edge edge_i from Y to Z[i]
Return X
```

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

The present invention has advantages over the prior art. Embodiments of the invention allow the creation of pseudo parse trees which contain information from both structured and unstructured data from a mixed record without knowledge of the format of the mixed record.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for creating parse trees from mixed records comprising:
receiving a mixed record including a first entry containing a first natural language phrase and a second entry containing a first structured data entry;
organizing the mixed record into a natural language sub-record and a structured data sub-record;
using the first natural language phrase to create a first parse tree structure joining words in the first natural language phrase with natural links indicating their semantic relationship within the first natural language phrase;
creating a first synthetic node representing the first structured data entry;
joining the first synthetic node representing the first structured data entry to the first parse tree structure using a synthetic link to a node in the first parse tree structure to produce a pseudo parse tree; and
sending the pseudo parse tree to a question answer system for answering user queries by reference to the pseudo parse tree.

2. The method as recited in claim 1, wherein the mixed record further comprises a third entry containing a second natural language phrase, and the method further comprises:
using the second natural language phrase to create a second parse tree structure joining words in the second natural language phrase with natural links indicating their semantic relationship within the second natural language phrase;
creating a second synthetic node;
joining the first and second parse tree structures to the second synthetic node using synthetic links; and
wherein the node representing the structured data entry is joined to the second synthetic node joining the first and second parse trees to produce the pseudo parse tree.

3. The method as recited in claim 2, wherein the mixed record further comprises a fourth entry containing a second structured data entry, and the method further comprises:
creating a third synthetic node representing the second structured data entry;
joining the third synthetic node representing the second structured data entry to the second synthetic node joining the first and second parse tree structures.

4. The method as recited in claim 2, wherein the synthetic links between the synthetic nodes representing the structured data and the parse tree structures and the natural links between the nodes representing words in the unstructured data in the parse tree are designated differently in the pseudo parse tree.

5. The method as recited in claim 1, wherein the mixed record contains a plurality of rows each containing structured and unstructured data and the sending, using creating, joining and sending elements are repeated for each of the rows so that a plurality of pseudo parse trees are created, each for a respective row in the mixed record and the plurality of pseudo parse trees are sent to the question answer system.

6. The method as recited in claim 5, further comprising:
receiving a user query by a question answer system;
converting the user query into a logical form; and
using the logical form to refer to information from the plurality of pseudo parse trees stored in a corpus of the question answer system;

forming an answer to the user query using information from at least one of the stored plurality of pseudo parse trees; and returning the answer to the user query.

7. The method as recited in claim 1, wherein the mixed record is a log containing system entered intrusion event structured data from a security program and user entered unstructured data including a description of the actions taken to ameliorate the intrusion event.

8. Apparatus, comprising:

a processor;

computer memory holding computer program instructions executed by the processor for creating parse trees from mixed records, the computer program instructions comprising:

program code, operative to receive a mixed record including a first entry containing a first natural language phrase and a second entry containing a first structured data entry;

program code, operative to organize the mixed record into a natural language sub-record and a structured data sub-record;

program code, operative to use the first natural language phrase to create a first parse tree structure joining words in the first natural language phrase with natural links indicating their semantic relationship within the first natural language phrase;

program code, operative to create a first synthetic node representing the first structured data entry;

program code, operative to join the first synthetic node representing the first structured data entry to the first parse tree structure using a synthetic link to a node in the first parse tree structure to produce a pseudo parse tree; and program code, operative to send the pseudo parse tree to a question answer system for answering user queries by reference to the pseudo parse tree.

9. The apparatus as recited in claim 8, further comprising:

program code, operative to using the second natural language phrase to create a second parse tree structure joining words in the second natural language phrase with natural links indicating their semantic relationship within the second natural language phrase;

program code, operative to create a second synthetic node;

program code, operative to join the first and second parse tree structures to the second synthetic node using synthetic links; and wherein the node representing the structured data entry is joined to the second synthetic node joining the first and second parse trees to produce the pseudo parse tree.

10. The apparatus as recited in claim 9, wherein the mixed record further comprises a fourth entry containing a second structured data entry, and the computer program instructions further comprise:

program code, operative to create a third synthetic node representing the second structured data entry; and program code, operative to join the third synthetic node representing the second structured data entry to the second synthetic node joining the first and second parse tree structures.

11. The apparatus as recited in claim 9, wherein the synthetic links between the synthetic nodes representing the structured data and the parse tree structures and the natural links between the nodes representing words in the unstructured data in the parse tree are designated differently in the pseudo parse tree.

12. The apparatus as recited in claim 8, wherein the mixed record contains a plurality of rows each containing structured and unstructured data and the sending, using creating, joining and sending elements are repeated for each of the rows so that a plurality of pseudo parse trees are created, each for a respective row in the mixed record and the plurality of pseudo parse trees are sent to the question answer system.

13. The apparatus as recited in claim 12, further comprising:

program code, operative to receive a user query by a question answer system; converting the user query into a logical form;

program code, operative to use the logical form to refer to information from the plurality of pseudo parse trees stored in a corpus of the question answer system;

program code, operative to form an answer to the user query using information from at least one of the stored plurality of pseudo parse trees; and program code, operative to return the answer to the user query.

14. A computer program product in a non-transitory computer readable medium for use in a data processing system, the computer program product holding computer program instructions executed by the data processing system for creating parse trees from mixed records, the computer program instructions comprising:

program code, operative to receive a mixed record including a first entry containing a first natural language phrase and a second entry containing a first structured data entry;

program code, operative to organize the mixed record into a natural language sub-record and a structured data sub-record;

program code, operative to use the first natural language phrase to create a first parse tree structure joining words in the first natural language phrase with natural links indicating their semantic relationship within the first natural language phrase;

program code, operative to create a first synthetic node representing the first structured data entry;

program code, operative to join the first synthetic node representing the first structured data entry to the first parse tree structure using a synthetic link to a node in the first parse tree structure to produce a pseudo parse tree; and program code, operative to send the pseudo parse tree to a question answer system for answering user queries by reference to the pseudo parse tree.

15. The computer program product as recited in claim 14, further comprising:

program code, operative to using the second natural language phrase to create a second parse tree structure joining words in the second natural language phrase with natural links indicating their semantic relationship within the second natural language phrase;

program code, operative to create a second synthetic node;

program code, operative to join the first and second parse tree structures to the second synthetic node using synthetic links; and wherein the node representing the structured data entry is joined to the second synthetic node joining the first and second parse trees to produce the pseudo parse tree.

16. The computer program product as recited in claim 15, wherein the mixed record further comprises a fourth entry containing a second structured data entry, and the computer program instructions further comprise:

program code, operative to create a third synthetic node representing the second structured data entry; and program code, operative to join the third synthetic node representing the second structured data entry to the second synthetic node joining the first and second parse tree structures.

17. The computer program product as recited in claim 15, wherein the synthetic links between the synthetic nodes representing the structured data and the parse tree structures and the natural links between the nodes representing words in the unstructured data in the parse tree are designated differently in the pseudo parse tree.

18. The computer program product as recited in claim 14, wherein the mixed record contains a plurality of rows each contain structured and unstructured data and the sending, using creating, joining and sending elements are repeated for each of the rows so that a plurality of pseudo parse tree are created, each for a respective row in the mixed record and the plurality of pseudo parse trees are sent to the question answer system.

19. The computer program product as recited in claim 14, further comprising:

program code, operative to receive a user query by a question answer system; converting the user query into a logical form;

program code, operative to use the logical form to refer to information from the plurality of pseudo parse trees stored in a corpus of the question answer system;

program code, operative to form an answer to the user query using information from at least one of the stored plurality of pseudo parse trees; and program code, operative to return the answer to the user query.

20. A method for creating parse trees from mixed records comprising:

receiving a mixed record including a first entry containing a first natural language phrase and a second entry containing a first structured data entry and a third entry containing a second natural language phrase;

using the first and second natural language phrases to respectively create a first and a second parse tree structure, each parse tree structure joining words in the natural language phrase with natural links indicating their semantic relationship within the natural language phrase;

creating a first synthetic node representing the first structured data entry and a second synthetic node for joining the first and second parse tree structures;

joining the first synthetic node representing the first structured data entry to the second synthetic node; and sending the pseudo parse tree to a question answer system for answering user queries by reference to the pseudo parse tree.

21. A method for creating parse trees from mixed records comprising:

receiving a mixed record containing a plurality of rows each row containing natural language phrase and a structured data entry;

using each natural language phrase to create a parse tree structure joining words in the first natural language phrase with natural links indicating their semantic relationship within the first natural language phrase;

creating a synthetic node for each of the structured data entries;

joining the synthetic node to the parse tree structure for each respective row using a synthetic link to a node in the parse tree structure to produce a pseudo parse tree; and sending the pseudo parse tree to a question answer system for answering user queries by reference to the pseudo parse tree.

* * * * *